United States Patent
Chen

(10) Patent No.: US 7,901,749 B2
(45) Date of Patent: Mar. 8, 2011

(54) POROUS INKJET PRINTING SUBSTRATE CONTAINING POLYMER-GRAFTED MINERAL OXIDES

(75) Inventor: Tienteh Chen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1538 days.

(21) Appl. No.: 11/084,571

(22) Filed: Mar. 18, 2005

(65) Prior Publication Data

US 2006/0093761 A1    May 4, 2006

Related U.S. Application Data

(60) Provisional application No. 60/623,520, filed on Oct. 29, 2004.

(51) Int. Cl.
*B41M 1/26* (2006.01)
(52) U.S. Cl. .................. 428/32.34; 428/32.35; 428/32.38
(58) Field of Classification Search ................ 428/32.34, 428/32.35, 32.38
See application file for complete search history.

(56) References Cited

U.S. PATENT DOCUMENTS

| | | | |
|---|---|---|---|
| 4,617,239 A * | 10/1986 | Maruyama et al. ........... | 428/452 |
| 5,759,673 A | 6/1998 | Ikezawa et al. | |
| 6,514,598 B1 | 2/2003 | Totani et al. | |
| 6,689,432 B2 | 2/2004 | Kitamura et al. | |
| 2001/0024713 A1 | 9/2001 | Quintens et al. | |
| 2002/0048661 A1 | 4/2002 | Yamamoto | |
| 2002/0081419 A1 * | 6/2002 | Purbrick et al. .............. | 428/195 |
| 2003/0104175 A1 | 6/2003 | Koike et al. | |
| 2004/0009357 A1 | 1/2004 | Kusudou et al. | |
| 2004/0009363 A1 | 1/2004 | Shouldice et al. | |
| 2004/0014857 A1 | 1/2004 | Bacher et al. | |

OTHER PUBLICATIONS

Boehmite, web page accessed on Mar. 3, 2004 at http://www.uky.edu/ArtSciences/Geology/webdogs/rocks/boehmite.htm, Mar. 3, 2004.
Kuraray Co. Ltd., Special Grades, web page accessed on Apr. 13, 2004 at http://www.poval.jp/english/poval/s_grades/sg_r.html.
Kuraray Co. Ltd., General Information of "Kuraray Poval", web page accessed on Apr. 13, 2004 at http://www.poval.jp/english/poval/g_info/gi_05.html.
Kuraray Co. Ltd., Major Industrial Uses of "Kuraray Poval", web page accessed on Apr. 13, 2004 at http:/www.poval.jp/english/poval/g_info/gi_05.html.
Kuraray Co. Ltd., Major Industrial Uses of "Kuraray Poval", web page accessed on Mar. 3, 2004 at http://www.poval.jp/english/poval/gradelist/gl_04.html.
Kuraray Co. Ltd., Special Grades, web page accessed on Mar. 3, 2004 at http://www.poval.jp/english/poval/s_grades/sg_r.html.
Londo, "On-Machine Coaing of Inkjet Paper Possible with Modified Kaolin", web page accessed on Mar. 3, 2004 at http://www.paperloop.com/db_area/archive/p.p. mag/2000/0005/focus1/htm.

* cited by examiner

*Primary Examiner* — Robert D. Harlan

(57) ABSTRACT

The invention relates to the discovery that pre-treating mineral oxide particles with a silylated polymeric coupling agent prior to suspending the particles in a binder polymer increases the crack resistance and adhesion of particles to a inkjet printing substrate such as paper sheets. Such pretreatment also reduces the amount of binder needed to achieve acceptable performance, leading to improvements in production speed and image quality.

36 Claims, No Drawings

POROUS INKJET PRINTING SUBSTRATE CONTAINING POLYMER-GRAFTED MINERAL OXIDES

CROSS-REFERENCES TO RELATED APPLICATIONS

This application is entitled to priority pursuant to 35 U.S.C. §119(e) to U.S. provisional patent application 60/623,520, which was filed on 29 Oct. 2004.

BACKGROUND OF THE INVENTION

The invention relates generally to the field of inkjet printing, and more specifically to methods of coating inkjet recording substrates.

Porous inkjet recording media are often coated with inorganic oxide particles to improve the rate of ink absorption. Such particles also improve the quality of images printed on the media, improving such properties as color gamut, gloss, coalescence, and bronzing.

Inorganic mineral oxide particles can be bound to an inkjet substrate, and to themselves, using a variety of known polymeric binders, the most common of which are polyvinyl alcohols (PVAs). Many PVAs are water-soluble and exhibit good binding both to inorganic oxide particles and to natural (e.g., cellulosic) and artificial (e.g., extruded polyethylene photo paper) substrates. Typically, inorganic oxide particles are suspended in a mixture of PVA and water and the suspension is applied to an inkjet printing substrate (e.g., paper), which is then dried and cut to yield finished inkjet printing sheets. Such a sheet is commonly referred to as a porous inkjet receiver, and ink applied to its surface appears to dry nearly instantly.

Mineral oxide-coated inkjet printing sheets exhibit several significant drawbacks. Separation of coating from the sheet (e.g., upon abrading or bending the sheet) and cracking within the coating leads to poor initial quality of the sheet and/or degradation over time of an image printed thereon. In order to minimize this problem, the coating can be dried slowly during manufacture, increasing the manufacturing cost. This problem can be improved by increasing binder level, but print qualities such as coalescence and ink absorption rate can be deteriorated by including additional binder. A need exists for inkjet printing substrates that do not exhibit these drawbacks.

One method of alleviating these drawbacks that has been proposed (e.g., U.S. Patent Application Publication No. 2002/0081419 and U.S. Patent Application Publication No. 2004/0014857) is using silanol-modified polymers to both cross-like the mineral oxide particles and to bind them to the substrate. Drawbacks of this approach include the high cost of silanol-modified polymers, premature crosslinking, and gelation of the coating fluids in the presence of the silanol-modified polymers. The present invention overcomes drawbacks in the prior art.

BRIEF SUMMARY OF THE INVENTION

The invention relates to a method of making a fluid for coating an inkjet recording medium. The method comprises combining mineral oxide particles, a solvent, and a silylated polymeric coupling agent for a period of time sufficient to permit significant coupling of the agent and the particles. Thereafter, a polymeric binder that is miscible with the agent is combined with the particles to form the fluid. Suitable coupling agents include silylated polyvinyl alcohols (PVAs) and silylated proteins. Suitable particles include particles of aluminum oxides and silicon oxides, such as alumina, Boehmite, pseudo-Boehmite, hydrates of these, fumed silica, colloidal silica, kaolin, and combinations of these.

Coupling of the agent and particles can be controlled by modulating the temperature of the mixture during coupling. Modulating the pH of the mixture during the reaction can also improve coupling.

The invention also relates to an inkjet recording medium coated with a fluid made by the methods described herein. Such a medium comprises a substrate coated with a composition comprising mineral oxide particles that are coupled with a silylated polymer and a polymeric binder that binds the particles to the substrate.

DETAILED DESCRIPTION OF THE INVENTION

The invention relates to improved inkjet recording media and to methods of making them. The media are made by permitting mineral oxide particles to react with a silylated polymeric coupling agent in the presence of a solvent. Once the particles and the agent have reacted for a sufficient period of time that a significant number of the particles are grafted, a polymer binder is added in an amount suitable for binding the mixture to a substrate. The substrate is thereby rendered suitable to receive inkjet printing ink.

DEFINITIONS

As used herein, each of the following terms has the meaning associated with it in this section.

A "silanyl moiety" means a silanol functional group (—RSi(OH)XY, where each of X and Y is independently a hydrogen, hydroxyl, alkoxyl, alkyl, alkylaryl, aryloxyl, or aryl radical) or a silicon-containing functional group capable of forming a silanol group in the solvent in which the coupling agent and the mineral oxide particles are combined, as described herein.

A "polymer" is a molecule formed or characterized by covalent binding between repeating subunits or a plurality of interchangeable subunits (e.g., amino acid subunits in a protein or nucleic acid subunits in a polynucleotide).

A "silylated" polymer is a polymer having at least one silanyl moiety, and preferably two or more such moieties, per polymer chain.

DETAILED DESCRIPTION

The invention relates to the discovery that pre-treating mineral oxide particles with a silylated polymeric coupling agent prior to suspending the particles in a binder polymer increases the crack resistance and adhesion of particles to a inkjet printing substrate such as paper sheets. Such pretreatment also reduces the amount of binder needed to achieve acceptable performance, leading to improvements in production speed and image quality.

A fluid for coating an inkjet recording medium or substrate is made by combining mineral oxide particles, a solvent, and a silylated polymeric coupling agent. The silanol groups of the coupling agent are able to form covalent linkages between the agent and the particles, thereby grafting the agent to the particles and/or (if the agent has two or more silanyl moieties per polymer chain) grafting the particles to one another. After this mixture has been permitted to react for a time sufficient to permit the grafting reaction to occur to an appreciable degree, a polymeric binder is added to yield the fluid. This coating fluid can be stored or immediately applied to a substrate onto which inkjet printing is to be directed. The agent is grafted to the particles and the coating fluid need include only enough binder to adhere the grafted particles to the particular substrate. The coating fluid can also contain a cross-linker which covalently links the coupling agent and the binder.

The Mineral Oxide Particles

The mineral oxide particles can be substantially any particles that are suitable for receiving inkjet ink and that have chemical moieties capable of reacting with silanol functional groups of the coupling agent to form covalent bonds. Silica- and alumina-based particles are commonly used in inkjet substrate coatings and are suitable for use in the methods described herein.

Useful mineral oxide particles include oxides of aluminum and silicon such as alumina, Boehmite, pseudo-Boehmite, silica, kaolin, hydrates of these, and mixtures or combinations of these. Such particles are available in a variety of grades and sizes and selection of appropriate particles for a desired application is within the ken of the skilled artisan in this field. For inkjet sheets intended for recording photographic images, desirable mineral oxide particles include fumed silica (e.g., CAB-O-SIL™ (Cabot Corporation) M-5 brand synthetic amorphous silica aerogel), colloidal silica (e.g., SNOW-TEX™ (Nissan Chemical America Corporation) MP-1040 brand colloidal silica), and Boehmite (e.g., DISPERAL™ (Sasol Limited, Germany) HP-14 brand highly dispersed Boehmite).

The amount of mineral oxide applied to the surface of an inkjet printing substrate can vary significantly, but is typically not less than about 20 grams per square meter. Greater or lesser quantities can be used, depending on the nature of the substrate, the quality of the print surface required or desired, or some combination of these. For example, 15 to 50 grams per square meter can be applied, but densities of 20 to 40 grams per meter are more common.

The size of the mineral oxide particles used is not critical. Substantially any particle sizes useful in the fields of inkjet printing or paper coatings can be used in the methods described herein. By way of example, particles having sizes in the range from 50 to 300 nanometers are suitable. In general, reducing the particle size will improve the smoothness of the coated surface and the image quality of the print. However particles having a size much less than about 50 nanometers can increase the viscosity of the coating fluid.

The Brunauer-Emmett-Teller (BET) surface area of the metal oxides can be from 100 to 500 square meters per gram, and is preferably from about 150 to 300 square meters per gram. Exemplary semi-metal oxide or metal oxide particulates that can be used include CAB-O-SIL LM-150, CAB-O-SIL M-5, CAB-O-SIL MS-75D, CAB-O-SIL H-5, CAB-O-SIL MS-5, CAB-O-SIL PG002, CAB-O-SIL PG022, each available from and trademarked by Cabot Corporation (Billerica, Mass.); and AEROSIL 160, AEROSIL 200, AEROSIL 300 AND AEROSIL 400, each available from and trademarked by Degussa Corporation (Parsippany, N.J.).

The Coupling Agent

A silylated polymeric coupling agent is combined with the mineral oxide particles, preferably in the absence of polymeric binders. The amount of the coupling agent that is combined with the particles should be sufficient to bind at least some of the coupling agent with substantially all mineral particles. The amount of the agent to be used is dependent on the identity of the agent, and more specifically on the density of silanyl moieties on or within the agent.

The chemical identity of the agent is not critical, except that each agent molecule must include at least one silanyl moiety. The coupling agent can contain multiple silanyl moieties to permit binding of a single coupling agent polymer chain to a plurality of particles. Preferred agents include silylated polyvinyl alcohols (PVAs), such as silylated forms of polyvinylpyrrolidones, copolymers of polyvinylpyrrolidone and PVA, copolymers of PVA with polyethyleneoxide, gelatins (e.g., CRODASONE C™ Croda Chemicals Limited) and other proteins, polyacrylamides, poly(hydroxyethyl) acrylates and methacrylates, cationic PVAs, and acetoacetylated PVAs.

PVAs are polyvinyl acetate polymers wherein many of the acetate moieties are replaced by hydroxyl moieties. The fraction (often expressed as a percentage) of acetate moieties replaced by hydroxyl moieties is referred to as the degree of hydrolysis. Silylated PVAs useful in the methods described herein should have a relatively high (e.g., >80%, preferably >88%, 95%, or 99%) degree of hydrolysis (calculated by considering silanyl moieties to be hydroxyl radicals). Nonetheless, the degree of hydrolysis of the agent is not critical. Likewise the molecular weight of the silylated PVA is not critical. Suitable silylated PVAs have molecular weights in the range from 1,000 to 500,000, and preferably in the range from 5,000 to 50,000. Suitable silylated PVAs include those sold as KURARAY POVAL™ (Kuraray Co., Ltd.) grades R-1130, R-2105, R-2130, and R-3109.

Although the coupling agent can also serve as a binder, it is preferable that it does not serve this role. For example, a suitable inkjet substrate coating fluid can be made by grafting mineral oxide particles with a silylated PVA (which can act as a binder, at least above certain molecular weight values) and using a non-silylated PVA as the primary binder. Because the cost and ease of manufacture of silylated coupling agents tend to be greater than the cost of common inkjet coating binders and because silylated coupling agents often cross-link by themselves to yield gelled particles, the methods described herein permit use of a relatively small amount of an agent that also functions as a binder, supplemented with a larger amount of a traditional binder.

The Solvent

The function of the solvent that is combined with the mineral oxide particles and the silylated polymeric coupling agent is simply to facilitate contact between the particles and the agent. In that regard, it is not important whether the agent is soluble (highly, sparingly, or at all) in the solvent. The agent is preferably soluble in the solvent, because this can improve contact between the dissolved agent and particles suspended in the solvent. The particles should be substantially insoluble in the solvent, so that their inkjet ink-receiving qualities are not degraded by contact with the solvent.

The chemical identity of the solvent is not critical, except that it must permit (and preferably facilitates) the covalent bonding reaction between the agent and the particles. Aqueous and water-containing solvents are suitable, and non-aqueous solvents will not necessarily prevent covalent bonding. Selection of an appropriate solvent is within the ken of the skilled artisan in this field.

The solvent should be relatively volatile, to facilitate removal of any residual solvent when the agent-linked particles are incorporated into an inkjet substrate coating and dried. Nonetheless, the particles and agent can be combined and reacted in a relatively non-volatile solvent that is replaced with another liquid (or otherwise removed) prior to incorporating the particles into a coating. Water is a preferred solvent, particularly when water-soluble agents such as silylated PVAs are used.

Combining the Particles, Coupling Agent, and Solvent

The order and rate at which the mineral oxide particles, the silylated polymeric coupling agent, and the solvent are combined are not critical. Some agents (e.g., silylated PVAs) are able to cross-link with themselves in solution. Such agents should be added last, to permit suspension of the particles in the solvent prior to adding the agent. The combined ingredients should, but need not necessarily, be mixed. Mixing increases contact between the particles and the agent, and can be achieved by any known mixing means, including stirring, shaking, swirling, tumbling, turbulent flow, and the like. The vigor with which the combined ingredients are mixed is not critical, and can be selected with regard to increasing particle-agent contacting without physically damaging or degrading the particles to a degree that renders them unsuitable for inkjet substrate coating. By way of example, the particles, agent, and solvent can be combined in a stirred tank.

Upon combining the particles, the agent, and the solvent, the particles and agent begin to react, creating covalent bonds between agent molecules and individual particles. The rate at which this reaction progresses can be empirically observed or estimated or calculated using information available to the skilled artisan. The degree of coupling that is achieved (i.e., the fraction of silanyl moieties of the agent that become covalently bound with particles) is dependent on the rate at which the agent molecules bind with particles, the rate at which the agent molecules bind with one another (or themselves), and the period of time during which the reaction is permitted to proceed.

When an aqueous solvent and a silylated PVA agent are used, the pH of the solvent is preferably neutral or higher initially (i.e., to limit or prevent coupling of the silylated PVA with itself). If the pH of the solvent is decreased over time, the rate of the coupling reaction (i.e., the reactions of silylated PVA both with the particles and with itself) increases. Using a relatively high initial pH and lowering it over time, allows silylated coupling agent to mix with the particles and avoids premature gelling of the agent. The initial coupling rate is slow and the reaction rate accelerates as the pH is lowered. A similar effect is presumed to occur in aqueous solvents using silylated agents other than PVAs.

Over time, the rate of the coupling reaction will tend to decrease (i.e., as silanyl moieties covalently bind other moieties) and the degree of coupling will increase. The reaction can be permitted to continue until a desired degree of coupling is achieved, until a preset time period elapses, until a physical property of the mixture achieves a preset value, or until such a property ceases to substantially change. By way of example, when silica or alumina particles are combined with a silylated PVA in an aqueous solvent, the opacity of the mixture can change as the degree of coupling increases. One can permit the reaction to proceed until the opacity reaches a selected value. Alternatively, the reaction can be permitted to proceed until the rate of change of the opacity falls below a selected value. Other methods of detecting the degree of coupling (e.g., spectroscopic methods) can also be used.

If the rate of the coupling reaction is too fast, the pH of the mixture can be raised to slow the rate of reaction. Alternatively, inhibitors of the reaction (e.g., short chain alcohols such as $C_1$-$C_6$ alcohols, e.g., ethanol or methanol) can be added to the mixture to slow the rate.

The proportions of the particles, agent, and solvent that are combined are not critical, except to the extent that the degree of coupling affects the inkjet substrate coating. The proportion of agent to particles depends on the chemical identity of each and the desired properties of the coating. When silylated PVAs are used, an amount of the silylated PVA not greater than about 5% the weight of the particles is typically employed, and amounts less than or equal to 2% or 1% the weight of the particles can be used.

The temperature of the mixture can also affect the rate of the coupling reactions. Increasing the temperature of the mixture increases the reaction rate and can decrease the processing time required to achieve a desired degree of cross-linking. By way of example, if silica particles, a silylated PVA, and water are heated to 50 degrees Celsius, the rate of reaction will increase. As a rule of thumb, the rate of reaction can be expected to approximately double for every ten degree Celsius increase in the temperature. By way of example, a suitable range of reaction temperatures is 30 to 95 degrees Celsius, with the range from 50 to 80 degrees Celsius considered more desirable.

The Binder

After coupling the mineral oxide particles and the silylated polymeric coupling agent, a polymeric binder is added to the mixture to form a fluid for coating an inkjet printing substrate. The binder should be a different polymer than the coupling agent. The difference between the binder can be simply the lack of silanyl moieties, such that the binder is a non-silylated polymer of the same type as the agent. By way of example, if the agent is a silylated PVA having a certain molecular weight and degree of hydrolysis, the binder can be a PVA having substantially the same (or different) molecular weight and substantially the same (or different) degree of hydrolysis, but have no (or different) silanyl moieties.

The chemical identity of the binder is not critical. Substantially any of the polymeric binders used in inkjet printing coatings can be used, alone or in combination. Examples of suitable binders include polyvinyl alcohols (PVAS, including water-soluble PVA copolymers such as copolymers of PVA and poly(ethylene oxide) or copolymers of PVA and polyvinylamine, cationic PVAs, acetoacetylated PVAs, and silyl-modified PVA); polyvinyl acetates; polyvinyl pyrrolidones (including copolymers of polyvinyl pyrrolidone and polyvinyl acetate); modified starches (including oxidized and etherified starches); water soluble cellulose derivatives (including carboxymethyl cellulose and hydroxyethyl cellulose); polyacrylamides (including polyacrylamide derivatives and copolymers); casein; gelatin; soybean protein; conjugated diene copolymer latexes (including maleic anhydride resin and styrene-butadiene copolymer); acrylic polymer latexes (including polymers and copolymers of acrylic and methacrylic acids); vinyl polymer latexes (including ethylene-vinyl acetate copolymers); functional group-modified latexes (including those obtained by modifying the above-mentioned polymers with monomers containing functional groups such as carboxyl, amino, amido, and sulfo groups); aqueous binders of thermosetting resins (including melamine resins and urea resin); and synthetic resin binders (including polymethyl methacrylate, polyurethane resin, polyester resin, amide resin, vinyl chloride-vinyl acetate copolymer, polyvinyl butyral, and alkyl resins). The foregoing list is not exhaustive.

A preferred type of binder are the PVAs. Used as the binder, a PVA should have a degree of hydrolysis from 80% to 99%, and preferably neither less than about 88% nor more than 95%. The molecular weight of such PVA is not critical and can be from about 1,000 to 500,000, or preferably from 5,000 to 500,000.

The amount of binder used is not critical beyond the amount necessary to bind the coupled particles to the substrate. Amounts from 0.01% to 40% by weight (relative to the weight of mineral oxide particles) are suitable. Amounts from 5% to 25% by weight can be preferable.

One or more additional ingredients (e.g., plasticizers, fillers, stabilizers (such as a hindered amine stabilizer), defoamers, dispersants, biocides, optical brighteners, viscosity modifiers, leveling agents, UV absorbers, anti-ozonants, or the like) can be combined with the binder and the grafted particles. The coating fluid so made can be applied to an inkjet printing substrate in any known way. Examples of suitable coating methods include Mylar rod coating, slot coating, cascade coating, curtain coating, and blade coating, and the like. Mylar rod coating is most suitable for hand drawdown coating. The substrate, which supports the inkjet recording materials can be paper, plastic, coated paper, fabric, art paper, or other known substrate used in the ink-jet printing arts. In one embodiment, photobase can be used as the substrate. Photobase is typically a three-layered laminate comprising a single layer of paper sandwiched by two polymeric layers, such as polyethylene layers.

Some prior art ink jet coatings use binders exclusively to prevent cracking and to retain mineral oxide particles. Relative to such coatings, the coatings described herein exhibit greater adhesion between particles and between particles and the substrate, likely owing to improved coupling between the particles and the coupling agents (e.g., silylated PVA) described herein. The coatings described herein therefore require less binder to achieve the same performance characteristics as prior art coatings. Because the coatings described herein require less binder than prior art coatings, faster drying of applied ink and reduced coalescence of ink droplets will be achieved.

The coating fluid described herein is suitable for coating inkjet printing substrates. It will be appreciated by the skilled artisan that the coating is also suitable for other applications in which localized absorption of fluid is desired. Examples of such applications include drying, humidity reduction, and fluid detection apparatus and priming of surfaces to receive applied fluids (e.g., priming of walls prior to painting). Other suitable applications will be evident to the skilled artisan.

EXAMPLES

The invention is now described with reference to the following Examples. These Examples are provided for the purpose of illustration only, and the invention is not limited to these Examples, but rather encompasses all variations which are evident as a result of the teaching provided herein.

Example 1

Grafting of CAB-O-SIL™ M-5 with KURARAY™ R-1130

Fumed silica, CAB-O-SIL™ M-5, was dispersed in deionized water using a high shear device (Ross Mixer) to form a dispersion (20.5% by weight solid). 100 grams of the resultant dispersion was stirred in a beaker. The pH was adjusted to 6.0, using 1 molar sodium hydroxide. While stirring quickly, 6 grams of KURARAY™ R-1130 (10% by weight in water) was slowly added to the silica dispersion. The mixture was stirred for another 30 minutes before adjusting the pH to 3.0, using 1 molar hydrochloric acid. To complete the grafting reaction, the mixture was then heated in a bath at 60 degrees Celsius for three hours.

Example 2

Formulation of Inkjet Recording Materials Containing PVA-Grafted Silica

60 Grams of PVA-grafted silica from Example 1 (19.3% by weight solid), was mixed with 0.233 gram of glycerol (50% by volume in water), 0.236 gram of Olin 10 G (5% solution), 8.27 grams of Mowiol 26-88 (14% by weight solid), and 6.68 grams of deionized water. The percentage solid of the resultant mixture was 17%. The mixture was stirred in a beaker in a 40 degrees Celsius water bath for 30 minutes. The resulting Brookfield viscosity was about 150 centipoises. The mixture was coated on photobase paper using a #90 Mylar rod, resulting in an inkjet recording material with a coat weight of 33 grams per square meter. After the sample dried, there was no macro- or micro-cracking, and the inkjet recording material exhibited a high level of glossiness.

Example 3

Formulation of Inkjet Recording Materials

60 Grams of non-grafted CAB-O-SIL™ M-5 dispersion (20.5% by weight solid) was mixed with 0.247 gram of glycerol, 0.247 gram of Olin 10 G (5% solution), 11.48 grams of Mowiol 26-88 (14% by weight solid), and 10.28 grams of deionized water. The percentage solid of the resultant mixture was 17%. The mixture was then stirred in a beaker in a 40 degrees Celsius water bath for 30 minutes. The Brookfield viscosity was approximately 150 centipoises. The mixture was coated on photobase paper using a #90 Mylar rod, resulting in an inkjet recording material with a coat weight of 33 grams per square meter. In contrast to the PVA-grafted material described in Example 2, the dried coating had severe cracking and separated from the photobase support.

Example 4

Use Silylated PVA as Sole Binder

60 Grams of non-grafted CAB-O-SIL™ M-5 dispersion (20.5% solid) was mixed with 0.247 gram of glycerol, 0.247 gram of Olin 10 G (5% solution), 16.07 grams of KURARAY™ R-1130 (10% by weight solid), and 6.0 grams of deionized water. The percentage solid of the resultant mixture was 17%. The mixture was then stirred in a beaker in a 40 degrees Celsius water bath for 30 minutes. The mixture gelled completely and was not able to be used to coat a printer substrate.

It is clear from examples 3 and 4 that neither regular PVA nor silylated PVA alone can be satisfactorily used as binders for the unmodified mineral oxide particles. Regular PVA will produce cracking if not enough is used. In addition, adding too much binder slows down the ink absorption rate and impedes coalescence. It is also evident that silylated PVA cannot by itself be used as a binder because it will prematurely couple with itself. The preferred combination is to graft the mineral oxide surface with silylated PVA and use regular non-silylated PVA as a binder.

The disclosure of every patent, patent application, and publication cited herein is hereby incorporated herein by reference in its entirety.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A method of making a fluid for coating an inkjet recording medium, the method comprising combining mineral oxide particles, a solvent, and a silylated polymeric coupling agent for a period of time sufficient to permit significant coupling of the agent and the particles, thereafter combining with the particles a polymeric binder that is miscible with the agent to form the fluid, wherein the pH of the combined agent, solvent, and particles is decreased during the period.

2. The method of claim 1, wherein the agent is a silylated polyvinyl alcohol (PVA).

3. The method of claim 2, wherein the agent is a silanol-modified PVA.

4. The method of claim 2, wherein the molecular weight of the silylated PVA is about from 1,000 to 500,000.

5. The method of claim 2, wherein the molecular weight of the silylated PVA is about from 5,000 to 50,000.

6. The method of claim 1, wherein the agent is a silylated protein.

7. The method of claim 1, wherein the particles include particles of an oxide of one of aluminum and silicon.

8. The method of claim 1, wherein the particles include particles selected from the group consisting of alumina, Boehmite, pseudo-Boehmite, hydrates of these, and combinations of these.

9. The method of claim 1, wherein the particles include silica particles.

10. The method of claim 9, wherein the silica particles are selected from the group consisting of particles of fumed silica, colloidal silica, kaolin, and mixtures of these.

11. The method of claim 1, wherein the weight of the agent is not more than 2% the weight of the particles.

12. The method of claim 1, wherein the weight of the agent is not more than 1% the weight of the particles.

13. The method of claim 1, wherein the agent is soluble in the solvent.

14. The method of claim 1, wherein the solvent comprises water.

15. The method of claim 1, wherein the combined agent, solvent, and particles are heated during the period.

16. The method of claim 1, wherein the pH of the combined agent, solvent, and particles is initially not less than 7.

17. The method of claim 1, wherein the agent is a silylated PVA and the binder is a PVA.

18. The method of claim 1, wherein the combined agent, solvent, and particles are mixed for a period of time sufficient to permit the viscosity to decrease to a value that does not substantially decrease over time.

19. A method of making a fluid for coating an inkjet recording medium, the method comprising combining mineral oxide particles, a solvent, and a silylated polymeric coupling agent for a period of time sufficient to permit significant coupling of the agent and the particles, thereafter combining with the particles a polymeric binder that is miscible with the agent to form the fluid, wherein the combined agent, solvent, and particles are mixed for a period of time sufficient to permit the viscosity to decrease to a value that does not substantially decrease over time.

20. The method of claim 19, wherein the agent is a silylated polyvinyl alcohol (PVA).

21. The method of claim 20, wherein the agent is a silanol-modified PVA.

22. The method of claim 20, wherein the molecular weight of the silylated PVA is about from 1,000 to 500,000.

23. The method of claim 20, wherein the molecular weight of the silylated PVA is about from 5,000 to 50,000.

24. The method of claim 19, wherein the agent is a silylated protein.

25. The method of claim 19, wherein the particles include particles of an oxide of one of aluminum and silicon.

26. The method of claim 19, wherein the particles include particles selected from the group consisting of alumina, Boehmite, pseudo-Boehmite, hydrates of these, and combinations of these.

27. The method of claim 19, wherein the particles include silica particles.

28. The method of claim 27, wherein the silica particles are selected from the group consisting of particles of fumed silica, colloidal silica, kaolin, and mixtures of these.

29. The method of claim 19, wherein the weight of the agent is not more than 2% the weight of the particles.

30. The method of claim 19, wherein the weight of the agent is not more than 1% the weight of the particles.

31. The method of claim 19, wherein the agent is soluble in the solvent.

32. The method of claim 19, wherein the solvent comprises water.

33. The method of claim 19, wherein the combined agent, solvent, and particles are heated during the period.

34. The method of claim 19, wherein the pH of the combined agent, solvent, and particles is decreased during the period.

35. The method of claim 34, wherein the pH of the combined agent, solvent, and particles is initially not less than 7.

36. The method of claim 19, wherein the agent is a silylated PVA and the binder is a PVA.

\* \* \* \* \*